3,684,653
PROCESS FOR PRODUCING L-THREONINE

Shigeo Abe, Tokyo, and Kenichiro Takayama, Chofu-shi, Japan, assignors to Kyowa Hakko Kogyo Co., Ltd., Tokyo, Japan
No Drawing. Continuation of application Ser. No. 565,096, July 14, 1966. This application July 15, 1968, Ser. No. 744,696
Claims priority, application Japan, July 16, 1965, 40/42,596
Int. Cl. C12d 13/10
U.S. Cl. 195—28 R      12 Claims

ABSTRACT OF THE DISCLOSURE

A process for producing L-threonine by fermentation. An isoleucine-, threonine- or homoserine-requiring strain of *Arthrobacter paraffineous* or *Corynebacterium hydrocarboclastus* is cultured under aerobic conditions in an aqueous nutrient medium containing a hydrocarbon as the main source of carbon.

CROSS REFERENCE TO RELATED APPLICATION

This application is a continuation of copending application Ser. No. 565,096, filed on July 14, 1966, now abandoned.

This invention relates to a process for producing L-threonine. More particularly, it relates to a process for the production of L-threonine by fermentation. Even more particularly, the invention relates to a process for the production of L-threonine by fermentation with certain microorganisms in the presence of a hydrocarbon as the major carbon source.

L-threonine, 2-amino-3-hydroxybutanoic acid, is one of the essential amino acids that is useful in the art as a dietetic. Since L-threonine is an intermediate metabolite of isoleucine biochemically, L-threonine produced in a culture medium has generally been further utilized for producing isoleucine or has been employed as a raw material for constituting proteins. Consequently, it has been difficult heretofore to accumulate a significant amount of L-threonine outside the microorganism cells by the culturing of microorganisms. Furthermore, it is known that an enzyme system taking part in the production of L-threonine from L-homoserine is obstructed because of the existence of various amino acids.

As a result of the above factors, almost all of the processes for producing L-threonine by fermentation described in the prior art are methods which comprise adding a large amount of L-homoserine, a precursor of L-threonine, to a culture medium and accumulating L-threonine therein [Kinoshita, Japanese patent publication 6590/63; Shimura, Amino Acids, volume 1, p. 74 (1959); and Sugahara, Preparatory Transcription of Lectures in the 1964 Convention of Japan Agricultural Chemistry Society, p. 192].

A sole report pertaining to the accumulation of significant amounts of L-threonine from carbohydrates by fermentation concerns the use of a nutrient-requiring mutant of *Escherichia coli* which is cultured with the use of mannitol or sorbitol as the source of carbon. An accumulation of 1.5–2.0 mg./ml. of L-threonine was obtained [Journal of Applied Microbiology, volume 9, p. 419 (1961)].

From another point of view, fermentation with the use of hydrocarbons has recently been greatly developed. Examples thereof include processes for obtaining certain kinds of products by culturing microorganisms with petroleum hydrocarbons used as a source of carbon or processes for obtaining expensive substances by means of chemical conversions and the like.

Research on the fermentation production of amino acids from hydrocarbons has been considerably undertaken also, and it is known in the prior art that glutamic acid, aspartic acid, alanine, valine, isoleucine, glycine, etc. can be accumulated by such a method, although acids other than glutamic acid have been accumulated only in very small amounts. However, there has been no work reported in the literature at all concerning the production of L-threonine by fermentation from hydrocarbons.

One of the objects of the present invention is to provide an improved process for the producttion of L-threonine which overcomes the disadvantages and deficiencies of the prior art methods.

Another object of the present invention is to provide a process for producing L-threonine by fermentation which may be carried out in an efficacious and simple manner.

A further object of the invention is to provide a process for producing L-threonine by fermentation which gives the product in high purity and good yield.

A still further object of the invention is to provide a process for producing L-threonine by fermentation which may be carried out advantageously on an industrial scale at low cost with the use of inexpensive starting materials to give a high yield of product.

These and other objects and advantages of the present invention will become apparent to those skilled in the art from a consideration of the following specification and claims.

In accordance with the present invention, it has been found that remarkably large quantities of L-threonine are accumulated in the fermentation liquor and may be recovered therefrom if fermentation or culturing is carried out with the particular strains noted below, which strains are capable of assimilating hydrocarbons, in an aqueous nutrient culture medium containing at least one hydrocarbon as the major carbon source. This process is industrially advantageous not only because hydrocarbons are an inexpensive starting material but also because a high yield of product is obtained therefrom.

Microorganism strains suitable for use in the process of the present invention include the isoleucine-, threonine- or homoserine-requiring strains of *Arthrobacter paraffineus* KY 4302–H357 ATCC 19558 which are obtained by exposing *Arthrobacter paraffineus* KY 4302 ATCC 15590 to ultraviolet rays and the isoleucine-, threonine- or homoserine-requiring strains of *Corynebacterium hydrocarboclastus* KY 4309–H524 ATCC 19560 obtained by exposing *Corynebacterium hydrocarboclastus* KY 4309 ATCC 15592 to ultraviolet rays.

Aliphatic hydrocarbons having from 10 to 20 carbon atoms are used as the hydrocarbon source in accordance with the present invention. These hydrocarbons may be used either singly or in mixtures of two or more. In either case, significant amounts of L-threonine can be accumulated in the fermentation liquor. Particularly high yields of L-threonine are obtained with the use of n-paraffins having from 13 to 18 carbon atoms. Examples of hydrocarbons which may be employed in the present invention include paraffins such as n-decane, n-undecane, n-dodecane, n-tridecane, n-tetradecane, n-pentadecane, n-hexadecane, n-heptadecane, n-octadecane, n-nonadecane and eicosane.

Small amounts of other carbon sources such as glucose, fructose, mannose, galactose, sucrose, mannitol, sorbitol, starch hydrolysate, blackstrap molasses, etc. may be used in the fermentation medium along with the hydrocarbon.

Either a synthetic culture medium or a natural medium is suitable in the present invention as long as it contains the essential nutrients for the growth of the particular strain employed and, in accordance with the present invention, contains a hydrocarbon as the main carbon source therein. Such nutrients are well known in the art and include substances such as a nitrogen source, inorganic substances and the like which are utilized by the microorganism employed in appropriate amounts. As a nitrogen source, various kinds of inorganic or organic salts or compounds, such as urea or ammonium salts such as ammonium chloride, ammonium nitrate, ammonium sulfate, ammonium carbonate, ammonium phosphate, ammonium acetate, etc., or natural substances containing nitrogen such as cornsteep liquor, peptone, yeast extract, meat extract, soybean meal hydrolysate, casein hydrolysates, fish meal, etc., may be employed. Mixtures of two or more of these substances may be used. Inorganic compounds which may be added to the culture medium include necessary inorganic salts such as magnesium sulfate, potassium dihydrogen phosphate, potassium monohydrogen phosphate, sodium chloride, iron sulfate, as well as other conventionally used salts of magnesium, iron, manganese, zinc, calcium and the like. When a purely synthesized culture medium is employed, it is necessary to add thereto thiamine and isoleucine, threonine or homoserine, depending upon the particular strain employed.

The fermentation is conducted under aerobic conditions conventional in the art, such as aerobic shaking of the culture or with stirring of a submerged culture with the introduction of sterilized air thereinto, at a temperature of about 25° to 40° C. It is preferable to keep the pH of the culture medium during culturing on the neutral side. If the pH of the culture medium shows a tendency to decrease during culturing, it should be adjusted to approximately 5–8.5 by the addition of calcium carbonate, ammonia water, sodium hydroxide, ammonium carbonate or the like to the culture medium.

Culturing is generally carried out for from 2 to 5 days. During this period of time, a considerable amount of L-threonine is accumulated in the fermentation liquor.

After the completion of fermentation, the cells are removed from the liquor and the accumulated L-threonine is recovered from the fermentation liquor by conventional means, such as ion exchange resin treatment as described in Example 1 hereinbelow.

It has been noted that the process of the present invention also provides L-valine and α-ketoglutaric acid, and small accumulations of L-glutamic acid, L-aspartic acid, L-leucine, L-serine, L-homoserine, L-alanine and the like in the culture liquor.

The following examples are given merely as illustrative of the present invention and are not to be considered as limiting. Unless otherwise noted, the percentages therein are by weight per liter of water.

Example 1

Culture media are prepared by pouring 10 ml. portions of the following composition into large test tubes:

0.1% $KH_2PO_4$
0.1% $Na_2HPO_4$
0.1% $MgSO_4 \cdot 7H_2O$
0.02% $FeSO_4 \cdot 7H_2O$
0.002% $MnSO_4 \cdot 4H_2O$
1.5% $NH_4NO_3$
200 μg./l. thiamine
10 μg./l. isoleucine
5% of a mixture of n-paraffins having from 11 to 18 carbon atoms The pH of the fermentation medium is about 7.0. After sterilization thereof, 2% by weight of $CaCO_3$, which has been prepared separately by dry sterilization, is added to each of the test tubes. Then, 5% of the seed strain obtained by culturing *Arthrobacter paraffineus* KY 4302–H357 ATCC 19558 with vibration in a bouillon slant at 30° C. for 24 hours is inoculated into the test tubes containing the aforesaid fermentation media.

Culturing is then carried out with aerobic shaking at 28° C. A bio-assay measurement after 4 days of culturing shows that the amount of L-threonine accumulated is 5.1 mg./ml. After completion of the culturing, the microorganism cells are removed by filtering off the culture liquor so as to obtain a filtrate. The pH of 1 liter of the obtained filtrate (containing 5.1 g./l. of L-threonine) is adjusted to 2.0 with hydrochloric acid. The resultant filtrate is adsorbed on an ion exchange resin [Diaion–SK–1 (H type)] and eluted with 1 N ammonia water after washing the ion exchange resin column with water. A fraction positive to the ninhydrin reaction is collected and concentrated at a temperature below 50° C. under reduced pressure so as to remove the ammonia therefrom. The concentrated liquid to which cupric carbonate has been added is boiled, and a dissolved solution of the copper salt of amino acid is adsorbed with a Diaion–SA–21A (OH type) ion exchange resin, eluted with 0.5 N hydrochloric acid after washing the resin column with water, and a fraction positive to the ninhydrin reaction is collected, decopperized by hydrogen sulfide, decolorized by activated carbon and then further concentrated. When ethyl alcohol is added to the concentrated liquor, 4.6 grams of white powdery crude crystals of L-threonine is obtained.

Example 2

*Arthrobacter paraffineus* KY 4302–H357 ATCC 19558, which has been cultured in a bouillon slant containing 2% by weight of n-paraffins having from 11 to 18 carbon atoms, is employed as the seed strain. The fermentation medium is the same as that described in Example 1, except that 0.01% by weight of cornsteep liquor and 1% by weight of sorbitol are added thereto. The other conditions of culturing are the same as described in Example 1. On the fourth day of culturing, the amount of accumulated L-threonine in the fermentation liquor is found to be 4.0 mg./ml.

Example 3

The same seed strain and fermentation media described in Example 1 are employed as well as the same conditions of culturing except that L-homoserine is added to the culture medium such that it is present therein in an amount of 2.5 mg./ml. after 24 hours of culturing. On the fourth day of culturing, the amount of accumulated L-threonine in the fermentation liquor is 4.7 mg./ml.

Example 4

*Corynebacterium hydrocarboclastus* KY 4309–H524 ATCC 19560, which has been cultured in a bouillon-agar slant for 24 hours at 30° C., is employed as the seed strain. One platinum loop of this seed strain is inoculated into the same culture medium as described in Example 1. Culturing is then carried out under aerobic conditions at 28° C. with a test tube shaker. The pH of the culture medium is adjusted during culturing to a range of from 6 to 8 by adding ammonium carbonate to the culture medium. On the third day of culturing, the amount of L-threonine accumulated in the fermentation liquor is found to be 5.4 mg./ml.

It is to be understood that other hydrocarbons similar to those specifically shown hereinabove may be employed such as kerosene, light oils, heavy oils, paraffin oils and the like, so long as they fall within the carbon number range set forth herein.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for producing L-threonine which comprises culturing a microorganism selected from the group consisting of an isoleucine-, threonine- or homoserine-requring strain of *Arthrobacter paraffineus* and an isoleucine-, threonine-, or homoserine-requiring strain of *Corynebacterium hydrocarboclastus* in an aqueous nutrient medium containing at least one hydrocarbon as the major source of carbon under aerobic conditions, and recovering the accumulated L-threonine from the resultant fermentation liquor.

2. The process of claim 1, wherein said hydrocarbon is an aliphatic hydrocarbon containing from 10 to 20 carbon atoms.

3. The process of claim 1, wherein said hydrocarbon is an aliphatic hydrocarbon containing from 13 to 18 carbon atoms.

4. The process of claim 1, wherein the pH of the culture medium is maintained at about 5.0–8.5.

5. The process of claim 1, wherein culturing is carried out at a temperature of from about 25° to 40° C.

6. The process of claim 1, wherein the L-threonine is recovered by means of an ion exchange resin treatment.

7. The process of claim 1, wherein said *Arthobacter paraffineus* strain is *Arthobacter paraffineus* ATCC 19558.

8. The process of claim 1, wherein said *Corynebacterium hydrocarboclastus* strain is *Corynebacterium hydrocarboclastus* ATCC 19560.

9. A process for producing L-threonine which comprises culturing *Arthobacter paraffineus* ATCC 19558 or *Corynebacterium hydrocarboclastus* ATCC 19560 in an aqueous nutrient medium containing at least one n-paraffin having from 10 to 20 carbon atoms as the major source of carbon under aerobic conditions at a temperature of from about 25° to 40° C., and recovering the accumulated L-threonine from the resultant fermentation liquor.

10. The process of claim 9, wherein said n-paraffin contains from 13 to 18 carbon atoms.

11. The process of claim 10, wherein the pH of the culture medium is maintained at about 7.0.

12. The process of claim 11, wherein the L-threonine is recovered by means of an ion exchange resin treatment.

References Cited
UNITED STATES PATENTS

| | | | |
|---|---|---|---|
| 3,099,604 | 7/1963 | Kinoshita et al. | 195—29 |
| 3,222,258 | 12/1965 | Iizuka et al. | 195—29 |
| 3,375,173 | 3/1968 | Nishimura et al. | 195—29 |

OTHER REFERENCES

Kinoshita et al., Advances in Applied Microbiology, pp. 218–223 (1959).

LIONEL M. SHAPIRO, Primary Examiner